April 15, 1958 S. ROBERTSON 2,830,732
CAN-PUNCTURING DISPENSING DEVICE WITH REMOVABLE HANDLE
Filed July 2, 1956

INVENTOR
SNELL ROBERTSON
BY
ATTORNEYS

United States Patent Office 2,830,732
Patented Apr. 15, 1958

2,830,732

CAN-PUNCTURING DISPENSING DEVICE WITH REMOVABLE HANDLE

Snell Robertson, Los Angeles, Calif., assignor to Swing-spout Measure Company, Los Angeles, Calif., a corporation of California Application July 2, 1956, Serial No. 595,407

4 Claims. (Cl. 222—90)

This invention relates to devices for opening containers, and more particularly to an improved device for puncturing a can and dispensing the contents therefrom.

Many products, including edible liquids, such as fruit juices, are marketed in sealed containers or cans. It is sometimes necessary, in connection with the dispensing of such food products, to drain the contents of the can into another receptacle, in which the product may be conveniently stored and dispensed in small quantities. The present invention provides an improved device which may be inserted directly into the metallic container and retained therein to provide a closable pouring spout for use in dispensing the product directly from the original container. Because of the difficulty of inserting a puncturing portion of the spout into the container, the invention provides a removable handle to facilitate this operation.

In connection with the dispensing of certain food products from cans and like containers, it is advantageous that the product container will be refrigerated during the period after the container is punctured and until the contents are completely discharged. Accordingly, it is important that the dispensing device be of compact form so as to occupy a minimum of space within the refrigerator. To this end, the removable handle assembly may be quickly attached to and removed from the spout proper. The arrangement is such that the handle may be attached to the spout for applying the force necessary to puncture a can and insert the spout therein. When the spout is properly in place, the handle may be quickly removed so that the combined container and dispensing device form a compact assembly. Advantageously, one handle can be used to operate several spouts, which can be left on the containers until all the contents have been dispensed.

One of the specific features of the invention resides in the provision of an improved can-puncturing dispensing device having a novel construction which provides a simple and convenient means for attaching a removable cover to the pouring spout. The cover is hinged to the top of the spout in such manner that when the container and spout are tilted, the cover will swing outwardly of the spout to permit the product to be freely dispensed therefrom. When the container is again moved into an upright position, the cover automatically swings shut to close off the end of the pouring spout.

For a better understanding of the invention, reference should be made to the following detailed description taken in conjunction with the accompanying drawings, in which.

Figure 1:
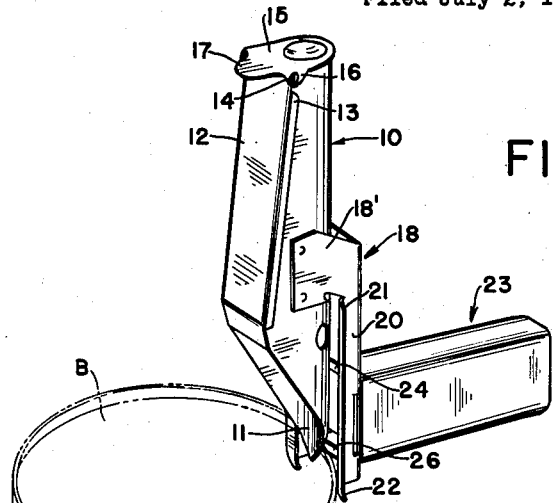
Fig. 1 is a perspective view of a dispensing device with the handle attached in one embodiment of the invention.

The dispensing device of the invention illustrated in the drawings comprises a combined spout and puncturing element 10, which is formed of a section of sheet metal of any suitable shape, for example, bent in the shape of a U, with one side open. The lower portion 11 of the element 10 is tapered to a point and constitutes a puncturing or cutting device. The upper portion of element 10 is closed along its open side by a plate 12 having longitudinally extending flanges 13 at each side. The flanges 13 are received along the opposite sides of the U-shaped element 10 and soldered or otherwise secured thereto in sealed relation. The upper portion of the assembly thus forms an enclosed tube.

At the upper end of the plate 12 are provided outwardly extending tabs 14, which extend laterally from the upper end of the spout 10. The tabs 14 form a pivot for a hinged cover 15 having downwardly projecting ears 16 at each side, which are received over the tabs 14. As will be apparent in Fig. 1, the pivotal axis for the cover 15 lies behind its center of gravity so that the cover tends to close automatically when the spout is in a vertical position. However, it is an important function of the cover that when the spout it tilted downwardly, the cover 15 will tend to swing away from the end of the spout so that liquids may be freely poured therethrough. To assist in manually opening the cover 15, it is provided with an extension or tongue 17 which projects rearwardly of the pivoting tabs 14 and may be engaged and depressed by the thumb.

Figure 3:
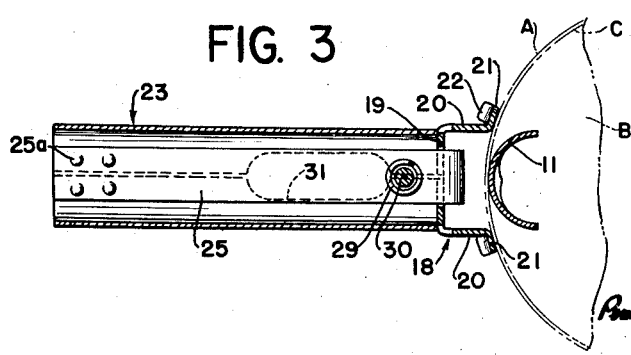
Fig. 3 is a section view taken on line 2—2 of Fig. 2.

Rigidly secured to the sides of the spout 10 is a guide member 18. The guide 18 is generally in the form of a channel and extends parallel to the cutting portion 11 of the spout 10. It is attached thereto by arms 18' which are welded to the opposite sides of the spout 10. As shown in Fig. 3, the channel-shaped guide 18 has a flat outer wall 19 and right-angularly disposed side walls 20 projecting generally toward the cutting portion 11. At the ends of the side walls 20 are longitudinally extending flanges 21 which project outwardly from the side walls 20 at an angle somewhat greater than 90°. As indicated in Fig. 3, the flanges 21 are adapted to bear against the cylindrical side walls A of a conventional container. The flanges 21, in combination with the lower portion 11 of the spout 10, are adapted to support the spout in a vertical position by engaging the opposite surfaces of the container side wall A.

At the lower ends of the flanges 21 are small guides 22, bent forwardly out of the planes of the respective flanges to facilitate application of the guide 18 to the side wall of the container.

It is contemplated that the dispensing device of the invention will be used with relatively large containers, such as are commonly used in connection with hotel and restaurant requirements. Containers of this type are formed of relatively heavy metal and considerable force may be required to puncture the top of the container and properly insert the pouring spout. Thus, in accordance with the invention, the removable handle 23 enables one to apply the required amount of force to the spout to insert it into a container. The handle 23 is formed of sheet metal bent in the form of a tube and of sufficient length to be conveniently grasped by the hand. At its inner end, the handle 23 is provided with an L-shaped tab 24 which projects inwardly and then upwardly for a short distance. Opposite the tab 24, the handle 23 is provided with a latch 25 in the form of an elongated metal strip secured to its outer end 25a to the handle and projecting beyond the inner end thereof. The inner end of the latch has a hook portion 26, bent downwardly and toward the inner end of the handle which terminates a short distance from the end.

As indicated in Fig. 3, the latch 25 may be advantageously used to secure the free edges of the sheet metal handle 23 together. Thus, when the handle 23 is bent in the form of a tube, the opposite edges of the metal blank will lie adjacent each other along the lower side of the handle. The latch 25 is then secured, internally of the handle, to the opposite edge portions of the handle element. This simultaneously secures the latch 25 in place and locks the edges of the handle together.

In accordance with the invention, the channel-shaped guide member 18 is provided in its outer wall 19 with a pair of vertically-spaced, horizontally-disposed slots 27, 28. The upper slot 27 is adapted to receive the L-shaped tab 24 at the top of the handle 23, and has a vertical dimension only slightly greater than the thickness of the metal used in forming the handle. The lower slot 28 is adapted to receive the free end 26 of the latch 25 and has a vertical dimension slightly greater than the hook portion 26.

Figure 2:
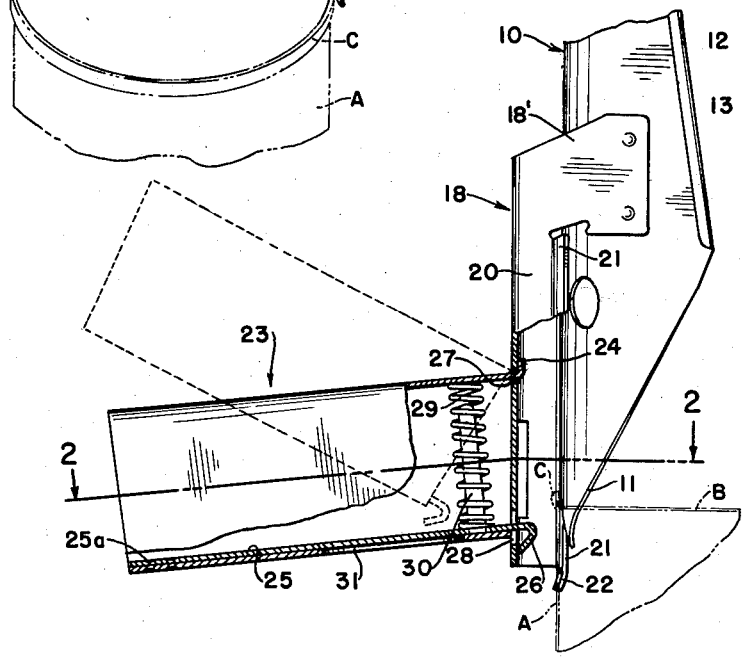
Fig. 2 is an enlarged fragmentary side elevation of the pouring spout and handle of Fig. 1, with parts broken away, illustrating the manner in which the handle is attached to and removed from the spout.

To engage the handle 23 with the spout 10, the end of the tab 24 is inserted into the upper opening 27, with the outer end of the handle being tilted upwardly, as shown in broken lines in Fig. 2. When the tab 24 is properly inserted, the handle 23 is pivoted downwardly until the hook portion 26 of the latch 25 engages the lower edge of opening 28. Upon the further pivoting movement of the handle 23 the angular surface of the hook portion 26 will be forced upwardly by the lower edge of opening 28 until the hook portion 26 passes through the opening. In this respect, it will be understood that the latch 25 is secured only at its outer end and may therefore spring upwardly somewhat at its inner end during the application of the handle to the spout.

As soon as the hook portion 26 enters the opening 28, the free end of the latch 25 springs downwardly, so that the hook 26 becomes engaged with the wall 19 of the guide member to lock the handle 23 in place. To assure that the hook 26 moves properly into latching position, a coil spring 29 bears upon the upper wall to the handle 23 and upon the free end portion of the latch 25 to continuously urge the latch downwardly in the handle. The spring 29 is held in place by a pin 30 carried by the latch 25 and received internally of the spring 29 in the manner shown in Fig. 2.

When the handle 23 is in place, substantial downward force may be applied to the pouring spout assembly to assist in puncturing the container and inserting the spout into operative position. When substantial force is applied to handle 23 during the insertion of the pouring spout into a container, a spout may tend to tilt outwardly because of the eccentric force couple. Accordingly, the flanges 21 on the channel-shaped guide member 18 are of substantial importance in that a relatively large surface is provided for bearing against the outer wall A of the can to resist the eccentric forces.

To apply the dispensing device to a container, the handle is gripped in one hand and the pointed portion 11 of the spout 10 is placed upon the top wall B of the container, just inside the bead C about the upper edge of the container. The guide 18 lies just outside the bead C. Downward pressure is then applied to the handle to a sufficient extent to cause the pointed portion 11 to puncture the top wall B. Upon the continued application of pressure the entire lower portion of the spout enters the container, to a point where the bead C of the can engages the lower edges of the guide mounting arms 18'.

After the spout is in place, the handle 23 is no longer necessary and should be removed so that the combined spout and container occupy as little space as possible. To this end, the lower wall of the handle 23 is provided with an opening 31 which exposes a portion of the latch 25. When it is desired to remove the handle, the free end of the latch 25 may be pressed upwardly in the handle by inserting the fingers through the opening 31. This raises the hook portion 26 of the latch into alignment with the opening 28 and permits the handle 23 to be pivoted outwardly about its upper edge to completely withdraw the hook portion 26 from the opening 28. The handle 23 is then pivoted upwardly to a sufficient extent to withdraw the L-shaped tab 24 from the opening 27.

One very important advantage of the new dispensing device is the removable handle 23, which may be quickly applied to the spout assembly during the initial puncturing of a can and which may be removed immediately thereafter so that the can and attached spout may be placed in a refrigerator without occupying excessive space. The use of the removable handle 23 is made possible by the provision of a rigid channel-shaped guide member having relatively wide flanges in its side adapted to bear against the outer wall of the can. The rigid guide member permits substantial force to be applied to the spout assembly through an off-center external handle, and the relatively wide flanges maintain the spout assembly in proper alignment despite the eccentricity of the puncturing force applied to the handle.

The specific arrangement for removably attaching the handle to the spout assembly is also advantageous in that the parts employed are economically formed and assembled and in that the operation of the device is highly simplified and adapted to be carried out by unskilled workers.

Another important feature of the invention is the specific structure of the pouring spout, including a U-shaped sheet metal member closed by a second sheet metal member having tabs at the top for pivotally mounting a cover member. The arrangement is simple and economical and provides a cover which automatically swings open when liquids are poured through the spout and automatically closes when the spout is returned to a vertical position. This feature is of substantial importance in connection with the dispensing of food products.

It will be understood that the specific device herein shown and described is intended to be illustrative only, as certain changes may be made therein without departing from the clear teachings of the invention. Reference should therefore be made to the following appended claims in determining the full scope of the invention.

I claim:

1. In a can-puncturing dispensing device, the combination of a tubular pouring spout, a can-puncturing cutter continuous with said pouring spout and substantially aligned therewith, a guide member rigidly associated with said pouring spout and cutter extending in parallel relation to said cutter, said guide member comprising a generally channel-shaped member formed of sheet metal and having side portions at its upper end projecting toward said pouring spout and rigidly connected thereto, said guide member having outwardly extending flange portions adjacent its lower end for bearing against the cylindrical side walls of a container and a pair of vertically spaced openings therein, and a handle having an L-shaped tab receivable in one of said openings, and a spring-pressed latch member carried by said handle member and receivable in the other of said openings, said handle being detachably engaged with said channel-shaped guide member, said handle extending laterally from said guide member and being engageable manually to facilitate the insertion of said cutter into a container.

2. The can-puncturing dispensing device of claim 1, further characterized by said handle comprising a section of sheet metal bent in the form of a tube, said latch member comprising an elongated member extending substantially throughout said handle and projecting from the inner end thereof, said latch member being secured to the adjacent opposite edge portions of said sheet metal section adjacent the outer end of said handle.

3. In a can-puncturing dispensing device, the combination of a tubular pouring spout, a can-puncturing cutter continuous with said pouring spout and substantially aligned therewith, a guide member rigidly associated with said pouring spout and cutter and extending in parallel relation to said cutter, said guide member including flanges adapted to bear against the side wall of a container over a substantial area to resist any tendency for the spout to tilt during the application of force thereto through said handle and a handle having tab-like means and a spring-pressed latch engaging said guide member, said guide member having a first opening for receiving said tab-like means when said handle is in a sharply tilted position with respect to said guide member, and said guide member having a second opening for receiving said latch when said handle is in a substantially right-angular position with respect to said guide member, whereby said handle is engageable manually to facilitate the insertion of said cutter into a container.

4. In a can-puncturing dispensing device, the combination of a tubular pouring spout, a can-puncturing cutter continuous with said pouring spout and substantially aligned therewith, said pouring spout and cutter being formed in part by a section of sheet metal of U-shaped cross-section, means closing off the open side of said U-shaped member near its upper end comprising a sheet metal closure member having longitudinally extending flanges engaging the side of said U-shaped member and secured thereto in sealing relation, said closure member having tab-like projections extending outwardly from the upper end thereof, and a cover member hingedly mounted by said tab-like projections and adapted when said spout is in a substantially vertical position to close off the top of said spout.

References Cited in the file of this patent
UNITED STATES PATENTS

| | | |
|---|---|---|
| 2,122,540 | Sedwick et al. | July 5, 1938 |
| 2,320,160 | Snowden | May 25, 1943 |
| 2,603,385 | Toth | July 15, 1952 |